United States Patent
Strom

[11] Patent Number: 6,017,264
[45] Date of Patent: Jan. 25, 2000

[54] DEFLECTION LAPPING APPARATUS AND METHOD FOR HYDRODYNAMIC BEARING SLIDER

[75] Inventor: Richard Albert Strom, Eagan, Minn.

[73] Assignee: Seagate Technology, Inc., Scotts Valley, Calif.

[21] Appl. No.: 08/695,373

[22] Filed: Aug. 9, 1996

[51] Int. Cl.[7] ....................................................... G11B 5/42
[52] U.S. Cl. ..................... 451/41; 29/603.12; 29/603.16; 360/103; 360/122
[58] Field of Search .................... 451/28, 41; 29/603.06, 29/603.12, 603.16; 360/102, 103, 104, 105, 122

[56] References Cited

U.S. PATENT DOCUMENTS

3,811,856  5/1974  Ruszczyk et al. .
5,072,322  12/1991  Yasar et al. .
5,086,553  2/1992  Goto et al. .
5,105,529  4/1992  Yasar et al. .

*Primary Examiner*—Eileen P. Morgan
*Attorney, Agent, or Firm*—Westman, Champlin & Kelly, P.A.

[57] ABSTRACT

A lapping apparatus for controlling curvature of a hydrodynamic bearing slider includes a bar of slider substrate material and a lapping carrier. The bar of slider substrate material includes at least one slider body having a bearing surface, and a back surface, with the back surface having a periphery and a center. The lapping carrier has a support surface which supports the slider back surface at the periphery and has a recess in the support surface adjacent the slider center such that the back surface is unsupported at the slider center. During the lapping process, the center of the slider deflects into the recess in the lapping carrier such that less material is lapped from the bearing surface at the center than at the periphery, which results in a positive curvature change in the bearing surface.

17 Claims, 7 Drawing Sheets

DEFLECTION LAPPING APPARATUS AND METHOD FOR HYDRODYNAMIC BEARING SLIDER

BACKGROUND OF THE INVENTION

The present invention relates to disc drive data storage systems and, more particularly, to a deflection lapping apparatus and method for controlling curvature of a hydrodynamic bearing slider.

Disc drives of the "Winchester" type are well known in the industry. Such drives use rigid discs coated with a magnetizable medium for storage of digital information in a plurality of circular, concentric data tracks. The discs are mounted on a spindle motor which causes the discs to spin and the surfaces of the discs to pass under respective head gimbal assemblies (HGAs). Head gimbal assemblies carry transducers which write information to and read information from the disc surface. An actuator mechanism moves the head gimbal assemblies from track to track across the surfaces of the discs under control of electronic circuitry. The actuator mechanism includes a track accessing arm and a load beam for each head gimbal assembly. The load beam provides a preload force which urges the head gimbal assembly toward the disc surface.

The head gimbal assembly includes a hydrodynamic (e.g. air) bearing slider and a gimbal. The gimbal is positioned between the slider and the load beam to provide a resilient connection that allows the slider to pitch and roll while following the topography of the disc. A slider includes a slider body having an air bearing surface which faces the disc surface. As the disc rotates, the disc drags air under the slider along the air bearing surface in a direction approximately parallel to the tangential velocity of the disc. Skin friction on the air bearing surface causes the air pressure between the disc and the air bearing surface to increase which creates a hydrodynamic lifting force that causes the slider to lift and fly above the disc surface. The preload force supplied by the load beam counteracts the hydrodynamic lifting force. The preload force and the hydrodynamic lifting force reach an equilibrium based upon the hydrodynamic properties of the slider and the speed of rotation of the disc. The transducer is typically mounted at or near the trailing edge of the slider.

Flying height is viewed as one of the most critical parameters of contact and non-contact recording. As the average flying height of the slider decreases, the transducer achieves greater resolution between the individual data bit locations on the disc. Therefore, it is desirable to have the transducers fly as close to the disc as possible. Flying height is preferably uniform regardless of variable flying conditions, such as tangential velocity variation from inside to outside tracks, lateral slider movement during seek operations and air bearing skew angles.

In certain applications, it is desirable to fabricate the slider such that the bearing surface has a positive curvature along the length and width of the slider. Length curvature is known as crown curvature. Width curvature is known as camber or cross curvature. The proper setting and control of length and width curvature improves flying height variability over varying conditions, improves wear on the slider and the disc surface, and improves takeoff performance by reducing stiction between the slider and the disc surface. In a typical slider fabrication process, length or width curvature is created by lapping the bearing surface on a cylindrically-shaped lapping surface or on a flat lapping surface while rocking the slider body back and forth in the direction of the desired curvature. The amount of curvature is determined by the radius of the rocking rotation.

SUMMARY OF THE INVENTION

A lapping apparatus for controlling curvature of a hydrodynamic bearing slider includes a bar of slider substrate material and a lapping carrier. The bar of slider substrate material includes at least one slider body having a bearing surface, and a back surface, with the back surface having a periphery and a center. The lapping carrier has a support surface which supports the slider back surface at the periphery and has a recess in the support surface adjacent the slider center such that the back surface is unsupported at the slider center. During the lapping process, the center of the slider deflects into the recess in the lapping carrier such that less material is lapped from the bearing surface at the center than at the periphery, which results in a positive curvature change in the bearing surface.

DETAILED DESCRIPTION OF THE PREFERRED EMBODIMENTS

Figure 1:
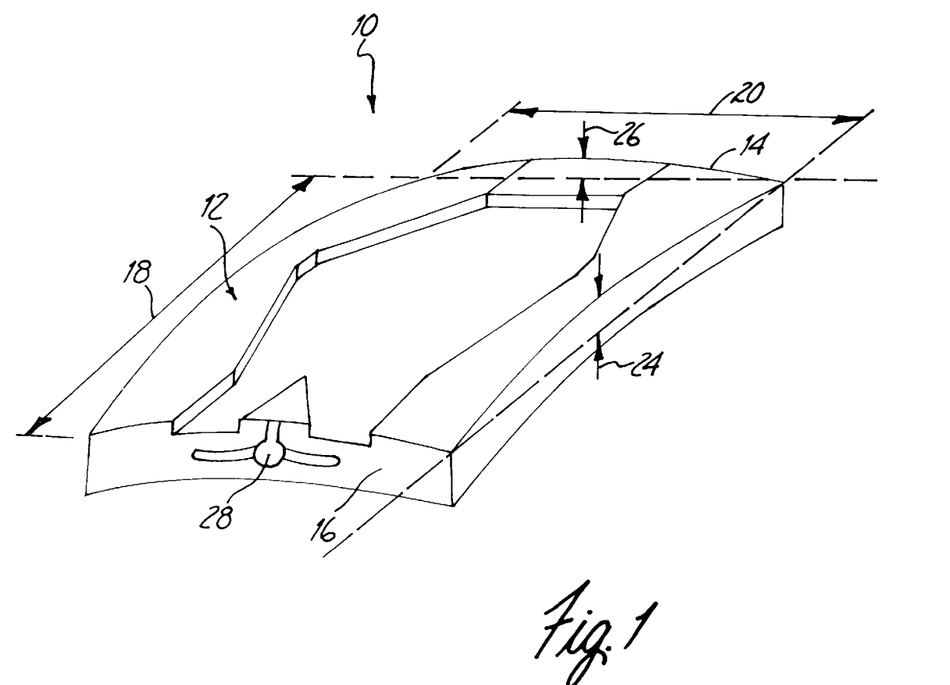
FIG. 1 is a perspective view of a slider having a bearing surface with a length and width curvature.

FIG. 1 is a perspective view of slider 10, as viewed from air bearing surface 12. Slider 10 has a leading surface 14, a trailing surface 16, a length 18 and a width 20. Slider 10 preferably has a positive curvature along length 18 and along width 20. With a positive curvature, air bearing surface 12 has an overall convex shape. A common measurement of the length curvature and the width curvature is the difference between the highest point along the length and width and the lowest point along the length and width, respectively. The height difference along the length curvature ("crown height") is shown at 24. The height difference along the width curvature ("cross height") is shown at 26. Typical crown and cross heights are on the order of zero to 1.5 microinches for a "30 series" slider having a length of 49 mils, a width of 39 mils and a thickness of 12 mils. A read and write transducer 28 is mounted to trailing surface 16.

Figure 2A:
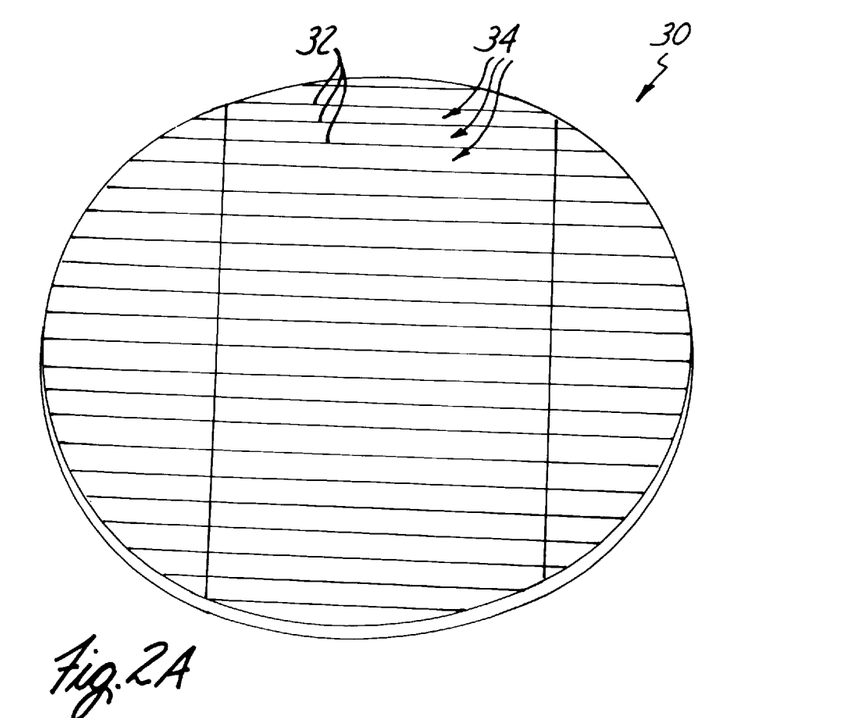
FIG. 2A is a perspective view of a wafer from which the slider shown in FIG. 1 is formed.
Figure 2B:
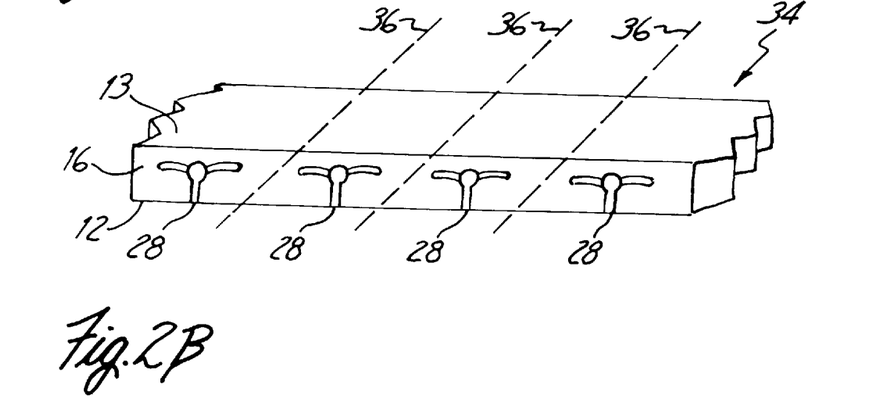
FIG. 2B is a fragmentary perspective view of a bar of sliders sliced from the wafer shown in FIG. 2A.

The length curvature and the width curvature are formed during fabrication of the slider body. The slider body is formed from a substrate known as a wafer. FIG. 2A is a perspective view of a typical wafer 30. In one embodiment, the bulk material of wafer 30 includes aluminum oxide and titanium carbide. A matrix of transducers (not shown) is applied to the top surface of wafer 30. Wafer 30 is then sliced along rows 32 into a plurality of bars 34. Each bar 34 includes a plurality of individual slider bodies, with each slider body having a corresponding read and write transducer 28 as shown in FIG. 2B. The sliced surfaces become bearing surface 12 and back surface 13, while the top surface of wafer 30 becomes trailing surface 16 of each slider body.

Once wafer 30 has been sliced into individual bars 34, the bearing surface 12 of each bar 34 is machined by a lapping process prior to forming the air bearing features. This can be a free bar batch lapping process, a double disc (two-sided) lapping process, a vertical grinding operation or any other surface machining treatment. The lapping process can include a single lap or sequence of lapping steps, each with a different coarseness. The lapping process is controlled to obtain a target throat height for each transducer 28. The throat heights are preferably uniform for each transducer in the bar.

Length curvature 24 or width curvature 26 can be created by lapping bearing surface 12 on a cylindrically-shaped lapping surface or on a flat lapping surface while rocking the bar back and forth in the direction of the desired curvature.

Once bars 34 are lapped, each bar 34 is diced along a plurality of dice lanes 36 into the plurality of individual slider bodies. The slicing and dicing operations are typically performed with a diamond-tipped saw blade.

Figure 3:
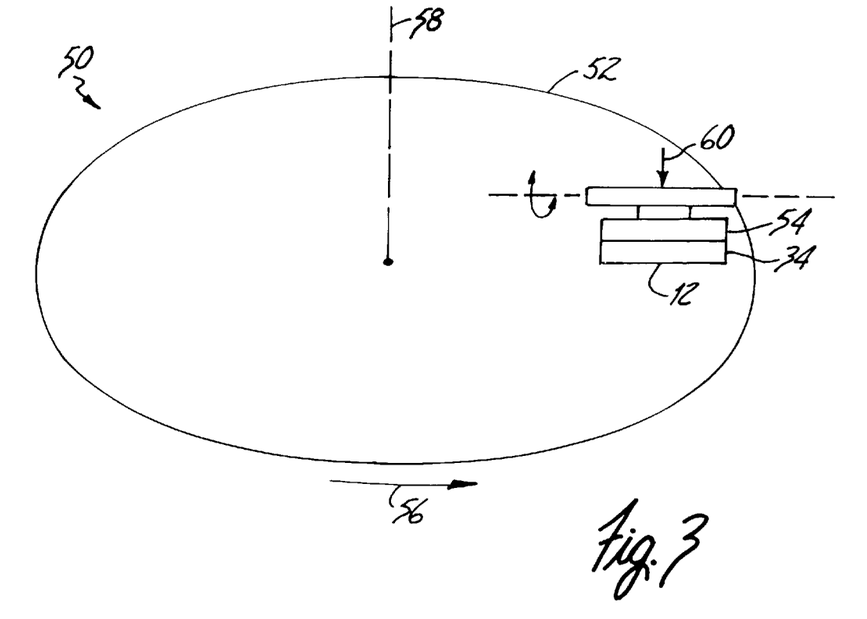
FIG. 3 is a schematic representation of a lapping apparatus according to one embodiment of the present invention.

FIG. 3 is a schematic representation of a lapping apparatus according to one embodiment of the present invention. Lapping apparatus 50 includes a flat lapping surface 52, a lapping carrier 54 and a bar 34 of slider bodies mounted to lapping carrier 54. Lapping plate 52 rotates in a direction indicated by arrow 56 about axis 58. Lapping plate 52 can include a variety of lapping surfaces, such as a hard surface which has been embedded with particles for removing material from bar 34 or a wet surface on which abrasive particles roll in a slurry between lapping plate 52 and bar 34, for example.

As lapping plate 52 rotates beneath bar 34, a normal force 60 is applied to lapping carrier 54 and bar 34 which forces bar 34 against lapping plate 52. One or more lapping carriers 54, each with a single bar 34, can be lapped independently on plate 52 at one time. In one embodiment, the normal force 60 applied to lapping carrier 54 is about 10–60 psi. The amount of force applied to each bar during the lapping process is a function of the size of the bar, the roughness of lapping plate 52, the lap time and the desired finish on bearing surface 12.

Bar 34 is mounted to lapping carrier 54 with an adhesive such as a hot melt glue. In one embodiment, the adhesive is preferably flexible such that bar 34, and thus each slider body within the bar, is held in a relaxed state with little or no change in curvature caused by the adhesive. It has been found that good control and reliability depends upon the ability of the mounted bar to relax in the bonding adhesive while any pre-existing surface stresses on the bar are changing as the lapping progresses to a final state.

Figure 4:
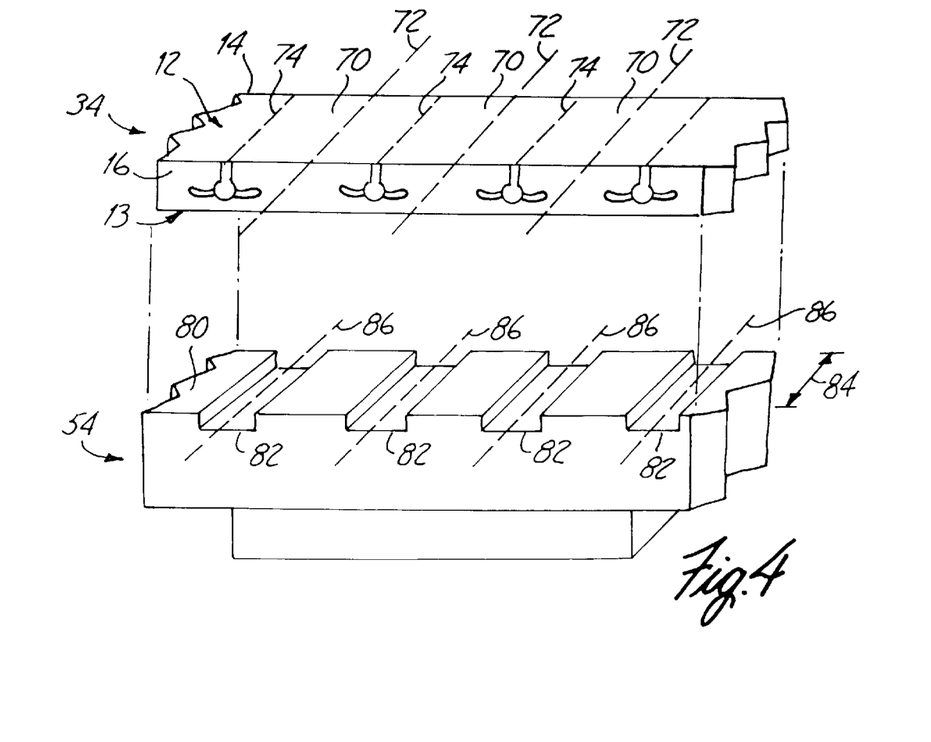
FIG. 4 is an exploded fragmentary view of a bar of sliders and a lapping carrier according to the present invention.

FIG. 4 is an exploded fragmentary view of bar 34 and carrier 54, as viewed from lapping plate 52. Bar 34 includes a plurality of slider bodies 70 which are separated by boundaries 72. Each slider body 70 has a longitudinal center line 74 and a periphery along leading surface 14, trailing surface 16 and boundaries 72.

Lapping carrier 54 has a support surface 80 which supports the back surface 13 at the periphery of each slider body 70. Support surface 80 includes a plurality of recessed slots 82, with each slot 82 corresponding to one of the slider bodies 70. Each slot 82 extends along a width direction 84 of lapping carrier 54 and has a center line 86 which is generally aligned with center line 74 of the corresponding slider body 70 when back surface 13 is mounted to lapping carrier 54. As a result, support surface 80 of lapping carrier 54 supports each slider body 70 at its periphery, but does not support each slider body 70 along its longitudinal center line 74.

When force 60 (shown in FIG. 3) is applied to carrier 54 to force bearing surface 12 against lapping plate 52, each slider body 70 deflects along its longitudinal center line 74 into the corresponding recessed slot 82. As a result, there is less material removed from bearing surface 12 along the longitudinal center line 74 than at the periphery of each slider body 70. This creates a width curvature on the bearing surface 12 of each slider body 70.

EXAMPLE

Figure 5A:
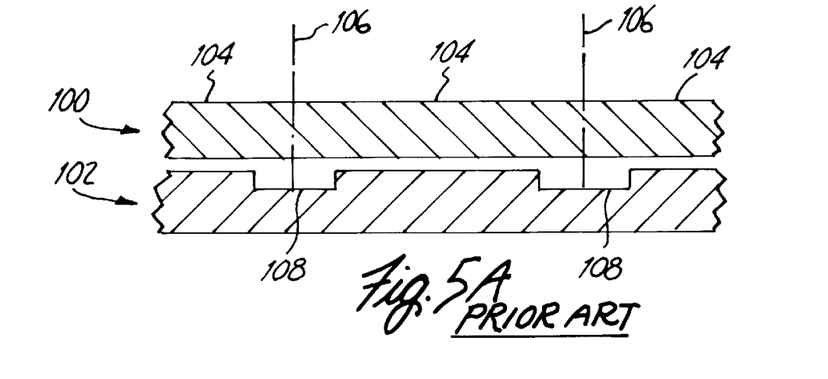
FIG. 5A is a cross sectional view of a bar of sliders mounted to a lapping carrier according to the prior art.

The lapping process of the present invention illustrated in FIGS. 3 and 4 was compared to a lapping process in which recessed slots 82 were aligned with slider boundary 72, as opposed to slider body longitudinal center lines 74. FIG. 5A is a cross sectional view of bar 100 mounted to lapping carrier 102 according to the prior art. Bar 100 includes a plurality of slider bodies 104 which are separated by boundaries 106. Lapping carrier 102 includes a plurality of dicing slots 108 which are aligned with boundaries 106. Dicing slots 108 are typically aligned in this manner such that after the lapping and other bar-level processes have been performed on bar 100, bar 100 can be diced with a saw blade along dicing slots 108 into individual slider bodies without damaging lapping carrier 102.

Figure 5B:
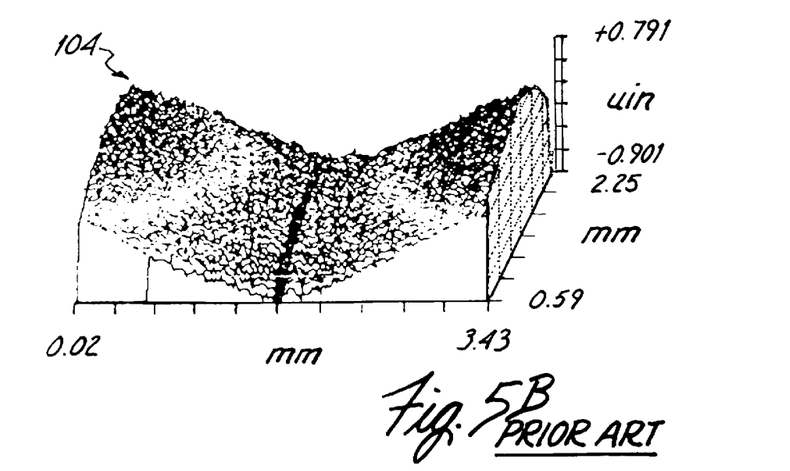
FIG. 5B is a graph of the topology of a bearing surface after lapping with the carrier shown in FIG. 5A.
Figure 5C:
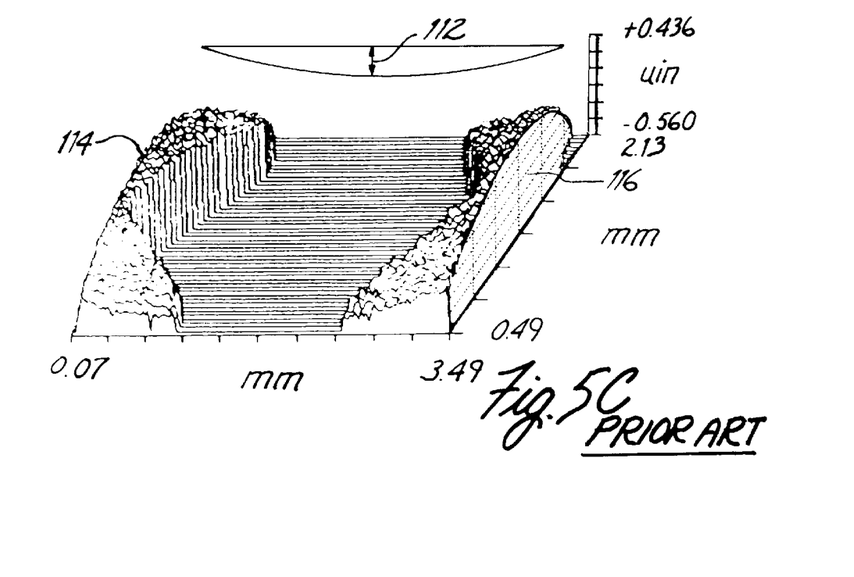
FIG. 5C is a graph illustrating a pair of side rails superimposed on the graph shown in FIG. 5B.

FIG. 5B is a graph of the topology of the bearing surface of one of the slider bodies 104 after lapping. FIG. 5C is a graph illustrating a pair of side rails 114 and 116 superimposed on the graph shown in FIG. 5B. Slider body 104 has a negative (concave) width curvature 112 across the width of the slider. The average width curvature was measured at −0.26 microinches over 33 slider positions on three bars, with a standard deviation of 0.07 microinches.

Figure 6A:
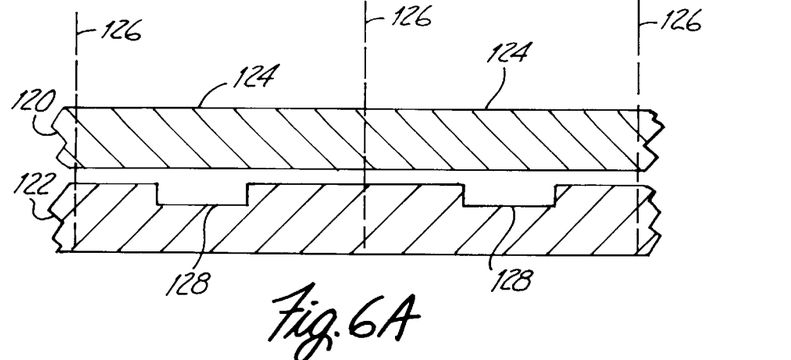
FIG. 6A is a cross sectional view of a bar of sliders mounted on a lapping carrier according to the present invention.

FIG. 6A is a cross sectional view of a bar 120 mounted on a lapping carrier 122 according to the present invention. Bar 120 includes a plurality of slider bodies 124 which are separated by boundaries 126. Lapping carrier 122 includes a plurality of deflection lapping slots 128 which are aligned with the center of slider bodies 124, as opposed to boundaries 126.

Figure 6B:
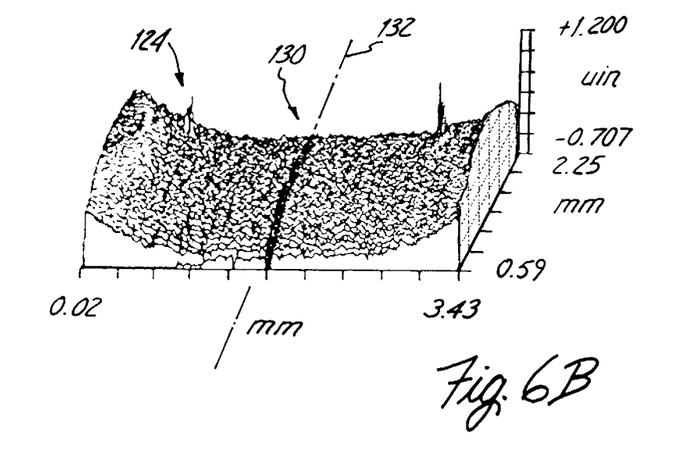
FIG. 6B is a graph illustrating the topology of a bearing surface after lapping with the carrier shown in FIG. 6A.
Figure 6C:
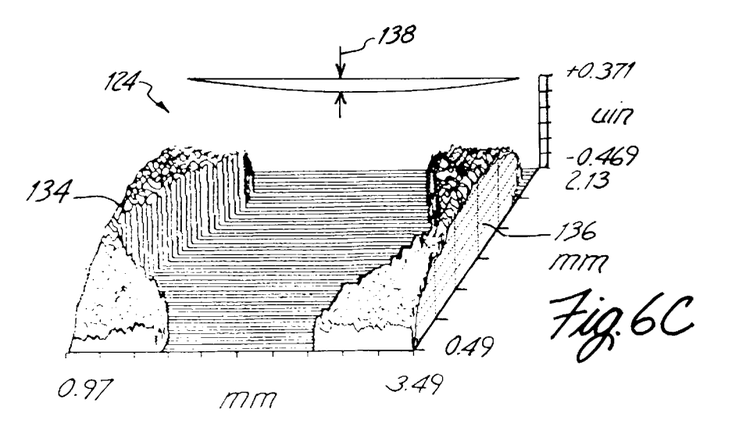
FIG. 6C is a graph illustrating a pair of side rails superimposed on the graph shown in FIG. 6B.

FIG. 6B is a graph illustrating the topology of the bearing surface of a slider body 124 between boundaries 126 after lapping. Slider body 124 has a small "bump" 130 along longitudinal center line 132 due to deflection of the slider body into deflection lapping slot 128 during lapping. The deflection reduced the amount of material removed from the deflected area. When the lapping pressure was removed, the deflected area recovered, leaving the bump 130 along longitudinal center line 132. The graph shown in FIG. 6C illustrates a pair of side rails 134 and 136 superimposed on the graph shown in FIG. 6B. Width curvature measurements were made on 30 slider positions on three bars. The average cross curvature was 0.00 microinches with a standard deviation of 0.06 microinches.

Comparing the graph shown in FIG. 6C with the graph shown in FIG. 5C, the width curvature showed an average increase of about 0.26 microinches. The deflection lapping method of the present invention is therefore useful for increasing width curvature at each slider position while lapping a bar of sliders on a flat or curved lapping plate.

Figure 7:
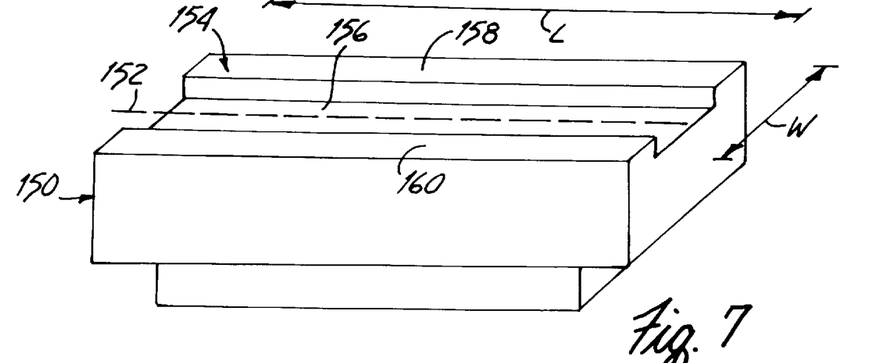
FIG. 7 is a perspective view of a lapping carrier having a lengthwise slot according to an alternative embodiment of the present invention.

The recesses in the support surface of the lapping carrier can have a variety of orientations and shapes. However, the recesses are preferably aligned with the center of the desired curvature, such as the center of the slider. FIG. 7 is a perspective view of a lapping carrier 150 having a length (L), a width (W) and a center line 152 extending along length (L). Lapping carrier 150 further includes a support surface 154 having a recessed slot 156 and support rails 158 and 160. Slot 156 extends along length (L) at center line 152. When a bar of slider substrate material is mounted to support surface 154, support rails 158 and 160 support each slider body within the bar at its periphery along the leading and trailing surfaces. As in the embodiment shown in FIG. 4, the center of each slider body deflects into slot 156 during lapping. However, slot 156 creates a length or "crown" curvature in each slider body from its leading surface to its trailing surface. Slots 82 (shown in FIG. 4) create a width or a "cross" curvature on each slider body.

Figure 8:
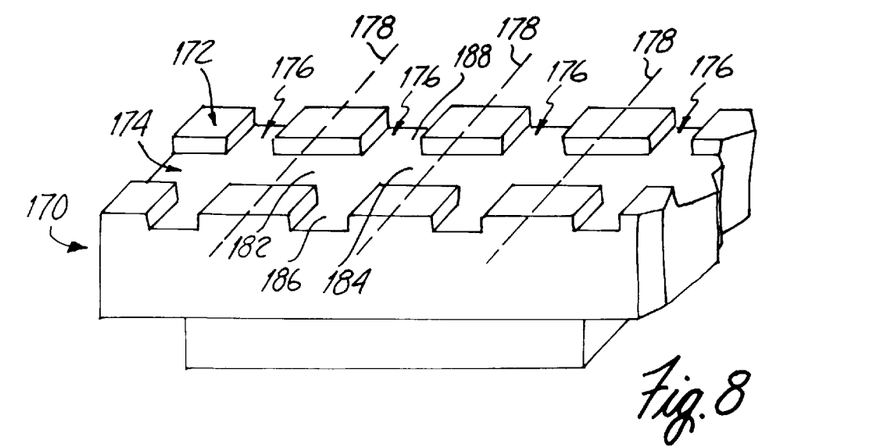
FIG. 8 is a perspective view of a lapping carrier having cross-shaped recesses according to another embodiment of the present invention.

FIG. 8 is a perspective view of a lapping carrier 170 according to another embodiment of the present invention, which is a combination of the embodiments shown in FIGS. 4 and 7. Lapping carrier 170 includes support surface 172 with a slot 174 extending along the length of lapping carrier 170 and a plurality of slots 176 extending across the width of lapping carrier 170. A bar of slider substrate material is mounted on lapping carrier 170 such that the boundaries between the slider bodies within the bar align with lines 178. Slots 174 and 176 together form the shape of a cross beneath each slide body, the cross having legs 182 and 184 oriented along the width of the slider body and legs 186 and 188 oriented along the length of the slider body.

Figure 9:
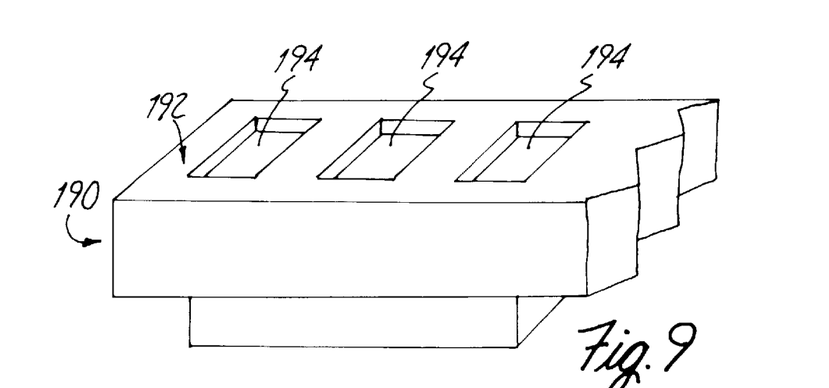
FIG. 9 is a perspective view of a lapping carrier having rectangular recesses according to another alternative embodiment of the present invention

FIG. 9 is a perspective view of a lapping carrier 190 according to another alternative embodiment of the present invention. Lapping carrier 190 includes a support surface 192 having a plurality of recesses 194 which have a rectangular shape. A bar of slider substrate material is mounted to lapping carrier 190 such that the center of each slider body within the bar is aligned with a center of each recess 194. In yet another alternative embodiment, recesses 194 have a circular shape as opposed to a rectangular shape.

Figure 10A:
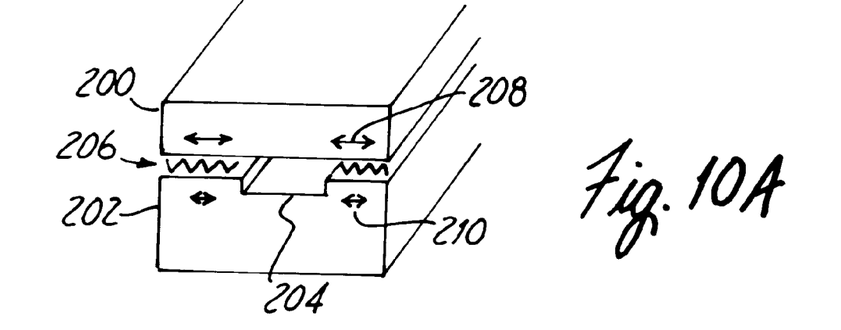
FIGS. 10A–10D are cross sectional views of a bar of sliders mounted to a lapping carrier during process steps of an alternative embodiment of the present invention.

The amount of positive curvature created in the bearing surface of each slider body can be further increased by forming the lapping carrier with a design as in FIG. 7 and from a material having a thermal coefficient of expansion that is less than the thermal coefficient of expansion of the substrate material of the bar. FIG. 10A is an end view of a bar of slider substrate material 200 mounted to a lapping carrier 202 having a deflection slot 204. Bar 200 is mounted to carrier 202 with a thin layer of a more rigid hot melt (or heat setting) adhesive 206. FIG. 10A shows the parts in a heated state in which adhesive 206 is melted. The length of arrows 208 and 210 represent the relative thermal coefficients of expansion of bar 200 and carrier 202, respectively.

Figure 10B:
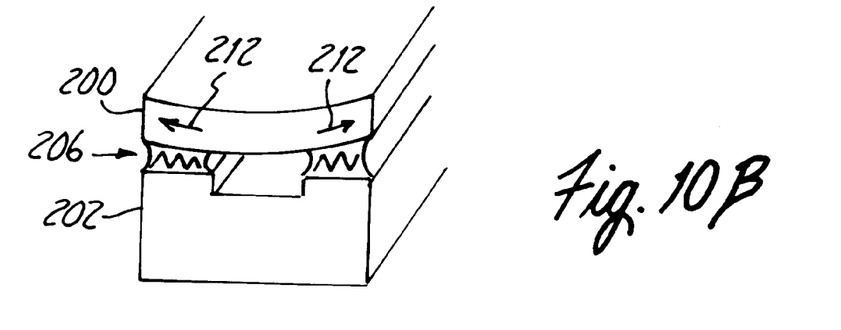

FIG. 10B is an end view of bar 200 and carrier 202 after the parts have cooled. Since the thermal coefficient of expansion of carrier 202 is less than the thermal coefficient of expansion of bar 200, a sheer stress will be created within bar 200 which will stretch the bar after the parts have cooled and the adhesive has set. Arrows 212 represent the sheer stress within bar 200. The center of bar 200 deflects into slot 204.

Figure 10C:
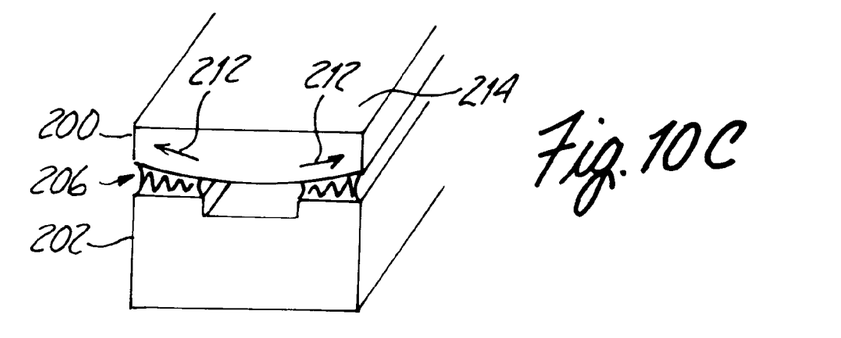
Figure 10D:
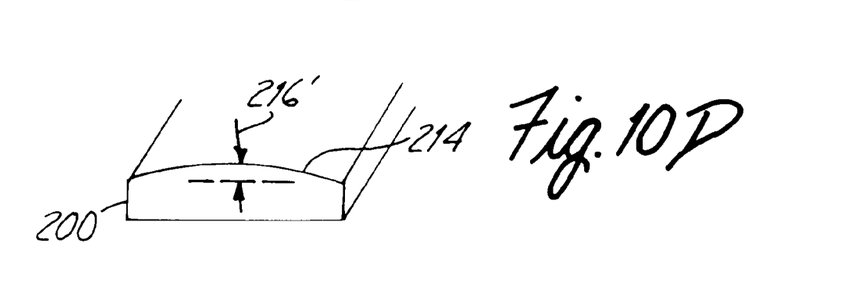

FIG. 10C is an end view of bar 200 and carrier 202 after bearing surface 214 of bar 200 has been lapped flat. Finally, FIG. 10D is an end view of bar 200 after the bar has been dismounted from carrier 202. After dismounting, the sheer stresses relax and create a positive curvature 216 in bearing surface 214. Therefore, selecting the thermal coefficient of expansion of the lapping carrier to be less than thermal coefficient of expansion of the slider substrate material further increases curvature of the bearing surface.

Although the present invention has been described with reference to preferred embodiments, workers skilled in the art will recognize that changes may be made in form and detail without departing from the spirit and scope of the invention.

What is claimed is:

1. A slider lapping apparatus comprising:
   a bar of slider substrate material which includes at least one slider body having a bearing surface and a back surface opposite to the bearing surface, with the back surface having a periphery and a center; and
   a bar carrier adapted to support the bar of slider substrate material and having a support surface which supports the slider back surface at the periphery and having a recess in the support surface adjacent the slider center such that the back surface is unsupported at the center.

2. The slider lapping apparatus of claim 1 wherein:
   the bar has a length and a width;
   the slider body has a longitudinal center line across the width of the bar; and
   the recess comprises a slot in the support surface which extends along the longitudinal center line of the slider.

3. The slider lapping apparatus of claim 1 wherein:
   the bar has a length, a width and a center line extending along the length; and
   the recessed area comprises a slot in the support surface which extends along the length of the bar at the center line.

4. The slider lapping apparatus of claim 1 wherein:
   the slider body has a length and a width; and
   the recess has a cross shape with first and second opposing legs oriented along the width and third and fourth opposing legs oriented along the length.

5. The slider lapping apparatus of claim 1 wherein the recess has a circular shape.

6. The slider lapping apparatus of claim 1 wherein the recess has a rectangular shape.

7. The slider lapping apparatus of claim 1 and further comprising:
   a hot melt adhesive positioned between the bar support surface and the slider back surface.

8. The slider lapping apparatus of claim 1 wherein:
   the slider substrate material has a thermal coefficient of expansion; and the bar carrier has a thermal coefficient of expansion which is less than the thermal coefficient of expansion of the slider substrate material.

9. A method of effecting surface curvature of a slider body within a bar of slider substrate material, wherein the slider body has a bearing surface and a back surface oposite to the bearing surface, with the back surface having a periphery and a center, the method comprising:

mounting the bar to a bar carrier at the back surface of the slider body, wherein the bar carrier supports the back surface of the slider body at the periphery while leaving the center unsupported;

lapping the bearing surface after mounting the bar to the bar carrier, wherein the center deflects toward the bar carrier during the step of lapping; and dismounting the bar from the bar carrier after the step of lapping.

10. The method of claim 9 wherein the slider body has a longitudinal center line and wherein the step of supporting comprises:

supporting the back surface of the slider body at the periphery while leaving the back surface unsupported along the longitudinal center line.

11. The method of claim 9 wherein the bar has a length, a width and a center line extending along the length and wherein the step of supporting comprises:

supporting the back surface of the slider body at the periphery while leaving the back surface unsupported along the length of the bar at the center line.

12. The method of claim 9 wherein the step of mounting comprises:

placing a hot melt adhesive between the lapping carrier and the back surface of the slider body;

heating the bar, bar carrier and hot melt adhesive; and cooling the bar, bar carrier and hot melt adhesive.

13. The method of claim 12 wherein the slider substrate material has a thermal coefficient of expansion and wherein the method further comprises:

forming the bar carrier with a material having a thermal coefficient of expansion that is less than the thermal coefficient of expansion of the slider substrate material.

14. The method of claim 9 and further comprising:

providing the bar carrier with a support surface which supports the slider back surface at the periphery and which has a recess at the center.

15. The method of claim 14 wherein the step of lapping comprises:

forcing the bearing surface toward a lapping surface with a force that is sufficient to deflect the center of the slider body into the recess.

16. A slider lapping apparatus comprising:

a bar of slider substrate material which includes at least one slider body having a bearing surface and a back surface opposite to the bearing surface, with the back surface having a periphery and a center;

means for supporting the back surface of the slider body at a portion of the periphery while leaving the center unsupported; and means for lapping the bearing surface with a lapping force as the back surface is supported by the means for supporting, wherein the center of the back surface deflects in the direction of the lapping force in response to the lapping force and the means for supporting prevents deflection of the portion of the periphery that is supported.

17. A slider lapping apparatus comprising:

a bar of slider substrate material comprising a bearing surface, a back surface opposite to the bearing surface and a plurality of slider bodies separated by slider boundaries, each slider body having a center; and a bar carrier supporting the back surface and having a plurality of slots facing the back surface, each slot being aligned with the center of a corresponding one of the slider bodies.

* * * * *